United States Patent
Lei et al.

(10) Patent No.: US 12,164,997 B1
(45) Date of Patent: Dec. 10, 2024

(54) BARCODE-READING APPLICATION THAT IS DESIGNED FOR A GENERAL-PURPOSE COMPUTING DEVICE AND THAT INCLUDES A MOTION DETECTION MODULE

(71) Applicant: The Code Corporation, Murray, UT (US)

(72) Inventors: Ming Lei, Concord, MA (US); Joerg-Thomas Rissmann, Landsberg (DE)

(73) Assignee: THE CODE CORPORATION, Murray, UT (US)

( * ) Notice: Subject to any disclaimer, the term of this patent is extended or adjusted under 35 U.S.C. 154(b) by 0 days.

(21) Appl. No.: 18/069,147

(22) Filed: Dec. 20, 2022

(51) Int. Cl.
  *G06K 7/14* (2006.01)
  *G06T 7/20* (2017.01)
  *G06T 9/00* (2006.01)
  *G06V 10/74* (2022.01)

(52) U.S. Cl.
  CPC .............. *G06K 7/1413* (2013.01); *G06T 7/20* (2013.01); *G06T 9/00* (2013.01); *G06V 10/761* (2022.01)

(58) Field of Classification Search
  CPC ........... G06K 7/1413; G06T 7/20; G06T 9/00; G06V 10/761
  See application file for complete search history.

(56) References Cited

U.S. PATENT DOCUMENTS

| | | | |
|---|---|---|---|
| 10,007,822 B2 | 6/2018 | Lei et al. | |
| 10,776,597 B1 | 9/2020 | Lee et al. | |
| 2012/0318869 A1* | 12/2012 | Edmonds | G06K 7/10792 235/462.14 |

\* cited by examiner

*Primary Examiner* — Matthew Mikels
(74) *Attorney, Agent, or Firm* — Thomas M. Hardman

(57) ABSTRACT

A barcode reading application for a general-purpose computing device includes a motion detection module in addition to a decoding module. The motion detection module is configured to process image frames captured by a camera of the computing device for the purpose of performing motion detection. The barcode reading application can be configured so that the decoding module does not process captured image frames until motion has been detected in the camera's field of view. Because fewer processing resources are required for motion detection than for barcode reading, including motion detection capability in the barcode reading application can reduce processor usage in the computing device compared to a scenario where the decoding module is constantly processing captured image frames. Advantageously, however this reduction in processor usage can be achieved without reducing responsiveness of the barcode reading application, because the barcode reading application can still remain running between successive read attempts.

8 Claims, 5 Drawing Sheets

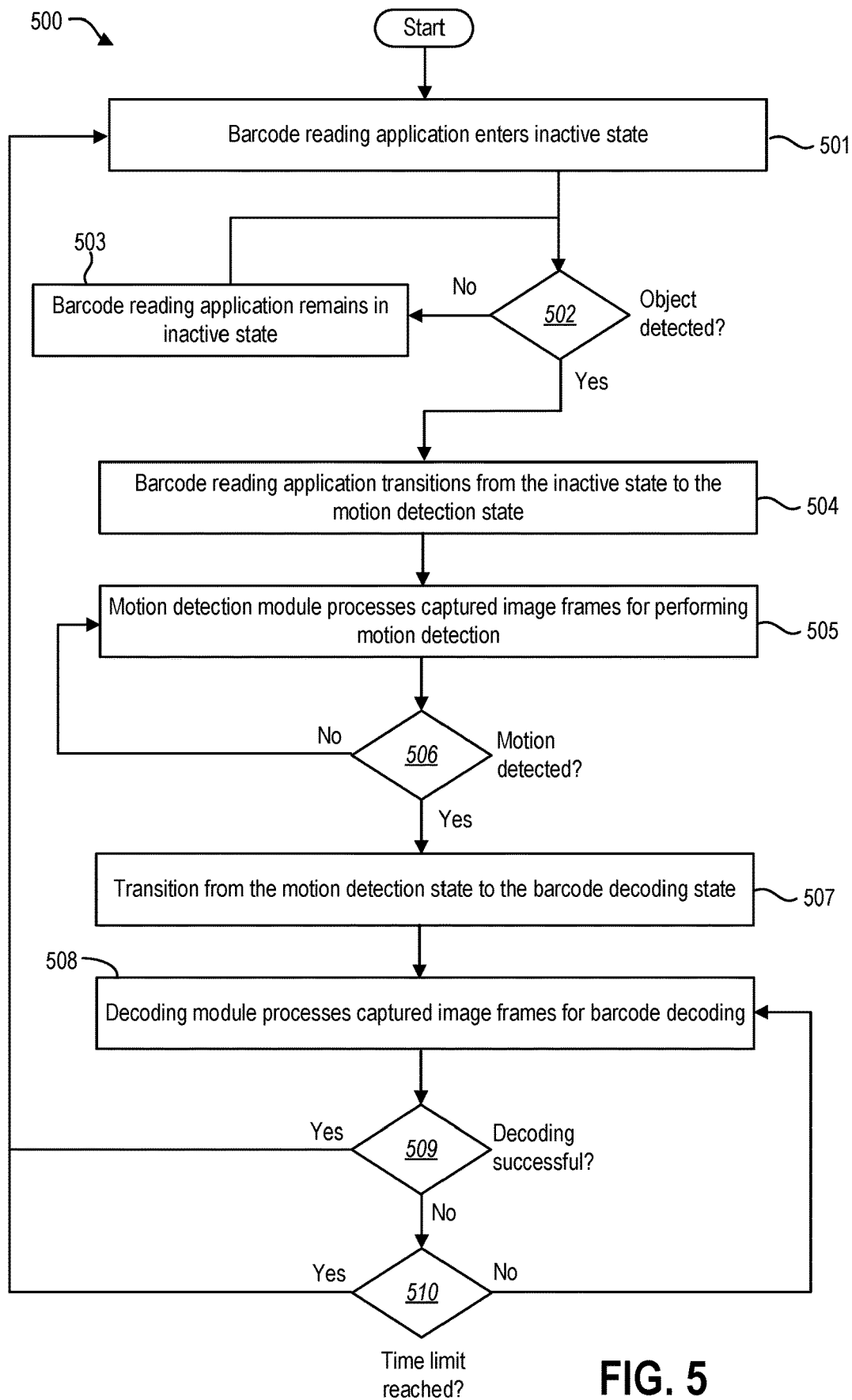

BARCODE-READING APPLICATION THAT IS DESIGNED FOR A GENERAL-PURPOSE COMPUTING DEVICE AND THAT INCLUDES A MOTION DETECTION MODULE

CROSS-REFERENCE TO RELATED APPLICATIONS

N/A

BACKGROUND & SUMMARY

The present disclosure is generally related to barcodes and barcode-reading devices. The term "barcode" refers to an optical machine-readable representation of information. The term "barcode-reading device" refers to any device that is capable of identifying or extracting information from barcodes. The process of identifying or extracting information from a barcode can be referred to as reading (or scanning) a barcode. When a barcode is successfully read (or scanned) by a barcode-reading device, the information that is identified or extracted from the barcode is commonly referred to as decoded data.

An image-based barcode-reading device includes a camera for capturing an image of a barcode to be read. Once an image of a barcode has been captured by the camera, a decoder processes the image and extracts the information contained in the barcode.

An image-based barcode-reading device can be a dedicated hardware device that is specifically designed for barcode reading. This type of device may be referred to as a dedicated barcode reader (or scanner). Alternatively, an image-based barcode-reading device can be a general-purpose computing device that includes a camera and that is equipped with software for reading barcodes. The software on a general-purpose computing device that is configured for barcode reading can include an application having barcode reading capability. Such an application may be referred to herein as a barcode reading application. A barcode reading application can include a decoding module that is configured to implement one or more barcode decoding algorithms.

A general-purpose computing device that is configured for barcode reading is often used differently than a dedicated barcode reader. A common use case for a dedicated barcode reader involves reading a plurality of different barcodes in rapid succession, such that very little time elapses between successive read attempts. In contrast, a common use case for a general-purpose computing device that is configured for barcode reading involves reading barcodes infrequently. In this situation, a significant amount of time can elapse between successive read attempts.

The use case where barcodes are read infrequently presents a significant challenge for developers of barcode reading applications. Users expect responsiveness. This means that, even when barcodes are read infrequently, a barcode reading application should remain running between successive read attempts so that the barcode reading application can respond quickly when the user needs to read a barcode. At the same time, it can be important to minimize processor usage, for many reasons. For example, many general-purpose computing devices that are configured for barcode reading are battery-powered devices (e.g., smartphones, tablet computers). It can be important to minimize processor usage so that the batteries on these devices last as long as possible.

These two goals (facilitating barcode reading application responsiveness and minimizing processor usage) can be in conflict with each other, especially in the use case where barcodes are read infrequently. For the sake of responsiveness, it is desirable to keep the barcode reading application running between successive read attempts. However, keeping the barcode reading application running between successive read attempts increases processor usage. With conventional approaches, when a barcode reading application is running on a general-purpose computing device, the decoding module in the barcode reading application is constantly processing captured image frames. This requires a significant amount of processor utilization.

The present disclosure is generally related to achieving a desirable balance between the competing goals of facilitating barcode reading application responsiveness and minimizing processor usage in the context of a general-purpose computing device that is configured for barcode reading.

In accordance with the present disclosure, a barcode reading application on a general-purpose computing device includes a motion detection module in addition to a decoding module. The motion detection module is configured to process image frames captured by the camera for the purpose of performing motion detection. In this context, the term "motion detection" refers to detection of any type of motion. For example, the motion that is detected may be motion of an object being brought into or taken out of the field of view of the camera. The object does not have to include a barcode (although it could include a barcode). Alternatively, or in addition, the motion that is detected may be motion of the computing device itself.

Including motion detection capability in the barcode reading application can be beneficial for many reasons. For example, instead of configuring the barcode reading application so that the decoding module is constantly processing captured image frames, the barcode reading application can be configured so that the decoding module does not process captured image frames until motion has been detected in the camera's field of view. Because fewer processing resources are required to process captured image frames for performing motion detection than to process captured image frames for barcode reading, including motion detection capability in the barcode reading application can reduce processor usage in the computing device compared to a scenario where the decoding module is constantly processing captured image frames. Advantageously, however this reduction in processor usage can be achieved without reducing responsiveness of the barcode reading application, because the barcode reading application can still remain running between successive read attempts.

The subject matter in the background and summary section is intended to provide an overview of the overall context for the subject matter disclosed herein. Additional features and advantages will be set forth in the description that follows. Nothing that is described in the background and summary section should be assumed to be prior art merely as a result of its mention in the background and summary section. Similarly, a problem mentioned in the background and summary section should not be assumed to have been previously recognized in the prior art.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which:

FIG. 5 illustrates another example of a method that can be performed by the barcode reading application in accordance with at least some embodiments of the present invention in which the computing device includes a proximity sensor.

DETAILED DESCRIPTION

Figure 1:
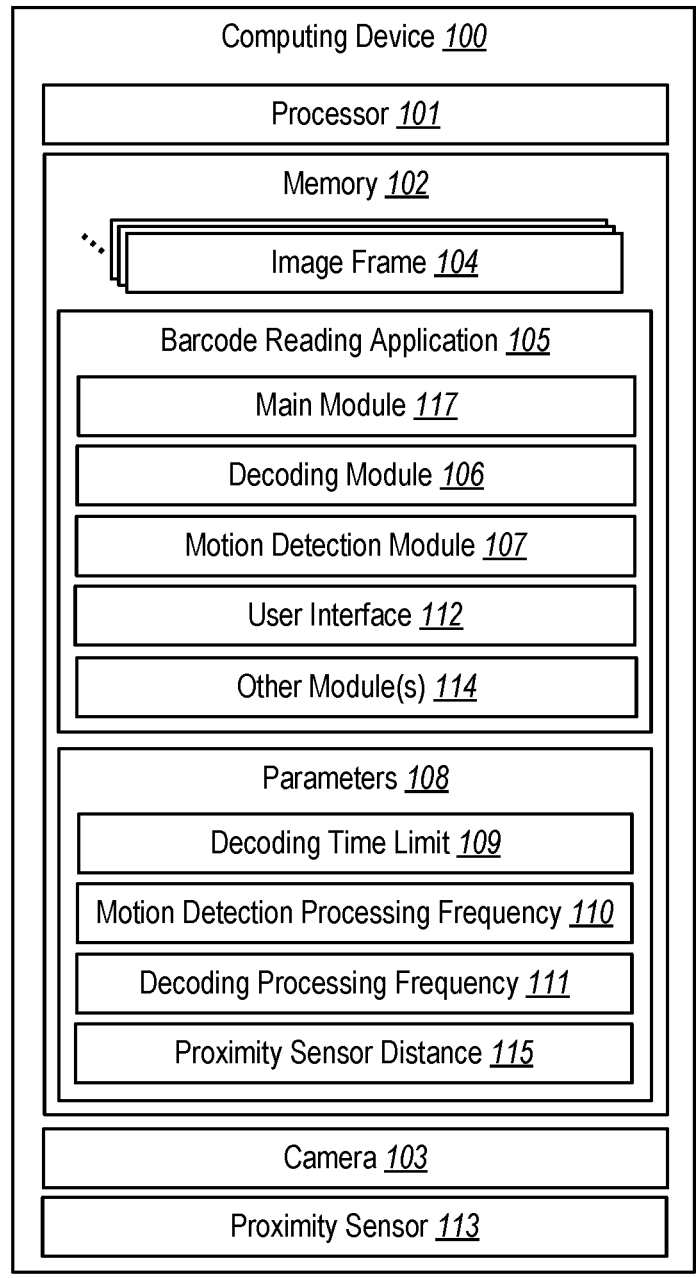
FIG. 1 illustrates an example of a general-purpose computing device that is configured for barcode reading and that includes a barcode reading application having a motion detection module in addition to a decoding module.

FIG. 1 illustrates an example of a general-purpose computing device 100 that is configured for barcode reading. The computing device 100 includes a processor 101, memory 102 that is communicatively coupled to the processor 101, a camera 103 that is configured to capture image frames 104, and a barcode reading application 105 in the memory 102. The barcode reading application 105 includes a main module 117 that controls the operation of the barcode reading application 105. The barcode reading application 105 also includes a decoding module 106 that implements one or more barcode decoding algorithms. Implementing the barcode decoding algorithm(s) involves finding and decoding images of barcodes in the image frames 104 captured by the camera 103.

In some embodiments, the computing device 100 can be a mobile computing device such as a smartphone or a tablet computer. In other embodiments, the computing device 100 can be a kiosk, a desktop computer, or another relatively large computing device that cannot reasonably be considered to be "mobile."

As indicated above, the barcode reading application 105 is an application having barcode reading capability. There are many different types of applications that can include barcode reading capability. For example, the barcode reading application 105 could be a point-of-sale application, a productivity application, a news/information application, a social media application, a customer loyalty application, a warehouse management application, or the like. It is not necessary for barcode reading to be the primary (or most important) capability of the barcode reading application 105, although it could be.

As discussed above, a common use case for a general-purpose computing device 100 that is configured for barcode reading involves reading barcodes infrequently, such that a significant amount of time can elapse between successive read attempts. However, even when barcodes are read infrequently, it can be important for the barcode reading application 105 to remain running between successive read attempts so that the barcode reading application 105 can respond quickly when a user of the computing device 100 needs to read a barcode. At the same time, it can also be important to minimize usage of the processor 101. There are many reasons for this. For example, if the computing device 100 is a battery-powered device, it can be important to minimize usage of the processor 101 so that the battery lasts as long as possible. The goal to minimize usage of the processor 101 can be in conflict with the goal to have the barcode reading application 105 be responsive because the decoding module 106 in the barcode reading application 105 can utilize a significant amount of the resources of the processor 101.

In order to balance these competing goals, the barcode reading application 105 includes a motion detection module 107 in addition to a decoding module 106. The motion detection module 107 is configured to process image frames 104 captured by the camera 103 for the purpose of performing motion detection. Including the motion detection module 107 in the barcode reading application 105 can help reduce usage of the processor 101 while still enabling the barcode reading application 105 to remain running between successive read attempts so that the barcode reading application 105 can respond quickly when a user of the computing device 100 needs to read a barcode.

Instead of configuring the barcode reading application 105 so that the decoding module 106 is constantly processing captured image frames 104 (as in conventional approaches), the barcode reading application 105 can be configured so that the decoding module 106 does not process captured image frames 104 until motion has been detected in the field of view of the camera 103. The processor 101 is not required to do as much work in order to perform motion detection as it is to process captured image frames 104 for barcode reading. In other words, executing the motion detection module 107 does not require as much utilization of the processor 101 as executing the decoding module 106. Therefore, including motion detection capability in the barcode reading application 105 can reduce usage of the processor 101 in the computing device 100 relative to current approaches where the decoding module 106 is constantly processing captured image frames 104.

The techniques disclosed herein can be beneficial in a wide variety of contexts and scenarios. For example, as noted above, in some embodiments the computing device 100 can be a kiosk with barcode reading capability. In some embodiments, the kiosk can be implemented using a battery-powered computing device (e.g., a tablet), and the kiosk's barcode reading capability may be utilized relatively infrequently. If the kiosk is not frequently being used to read barcodes, then it does not make sense to have the decoding module 106 constantly processing captured image frames 104 because the vast majority of the captured image frames 104 will not include barcodes. By implementing motion detection as disclosed herein, the kiosk can reduce its power consumption, which can be beneficial for various reasons. For example, reducing the kiosk's power consumption may prolong the life of the kiosk's battery. Even if the kiosk has access to a constant supply of alternating current (AC) power, reducing the kiosk's power consumption may reduce the amount of battery-supplied backup power that needs to be included in the kiosk.

As another example, the barcode reading application 105 could include one or more features that require significant utilization of the processor 101 (e.g., artificial intelligence). By reducing the utilization of the processor 101 for the purpose of barcode decoding, this makes the processor 101 more available for the other feature(s) that require significant utilization of the processor 101.

Those skilled in the art will recognize many additional benefits to reducing utilization of the processor 101 for barcode decoding.

The memory 102 of the computing device 100 also stores one or more parameters 108 that are relevant to the barcode reading application 105. These parameters 108 include a decoding time limit 109, a motion detection processing frequency 110, a decoding processing frequency 111, and a proximity sensor distance 115. These parameters 108 will be described in greater detail below.

The barcode reading application 105 can include a user interface 112. A user of the barcode reading application 105 can exercise at least some degree of control over certain aspects of the barcode reading application 105 via the user interface 112. The barcode reading application 105 can include one or more other modules 114 as well.

In some embodiments, the computing device 100 can include a proximity sensor 113. The proximity sensor 113 can be configured to determine when another object is within a certain distance of the computing device 100. This distance may be referred to herein as the proximity sensor distance 115. The proximity sensor 113 can enable the barcode reading application 105 to be configured in a way that provides even more savings with respect to the usage of the processor 101 in the computing device 100. This will be described in greater detail below.

Figure 2:
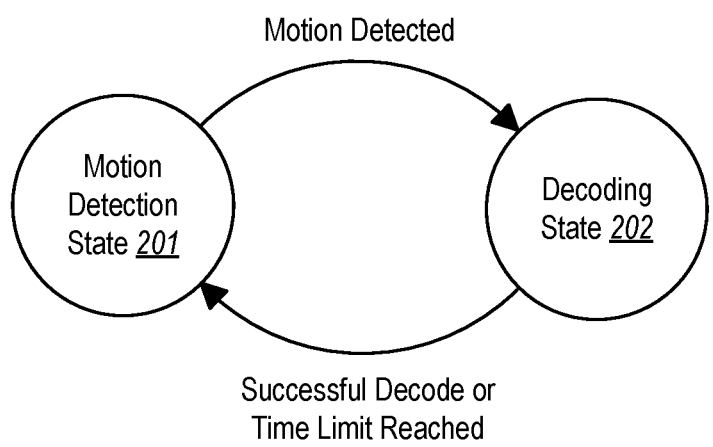
FIG. 2 is a state diagram that illustrates two possible states (a motion detection state and a decoding state) in which the barcode reading application can be configured to operate in accordance with at least some embodiments of the present invention.

FIG. 2 illustrates an example of a state diagram that represents certain states in which the barcode reading application 105 can be configured to operate. In the depicted example, the barcode reading application 105 is capable of operating in a motion detection state 201 and in a decoding state 202.

Broadly speaking, the barcode reading application 105 performs motion detection while in the motion detection state 201 and implements one or more barcode decoding algorithms while in the decoding state 202. More specifically, while the barcode reading application 105 is in the motion detection state 201, the motion detection module 107 processes captured image frames 104 and the decoding module 106 does not process captured image frames 104. Conversely, while the barcode reading application 105 is in the decoding state 202, the decoding module 106 processes captured image frames 104 and the motion detection module 107 does not process captured image frames 104.

The barcode reading application 105 transitions from the motion detection state 201 to the decoding state 202 when the motion detection module 107 detects motion in the field of view of the camera 103. The barcode reading application 105 transitions from the decoding state 202 to the motion detection state 201 when the decoding module 106 successfully decodes a barcode or the decoding module 106 processes captured image frames 104 for a pre-determined time period without successfully decoding a barcode. This pre-determined time period may correspond to the decoding time limit 109 mentioned above.

In some embodiments, the main module 117 controls whether the barcode reading application 105 is in the motion detection state 201 or the decoding state 202. The main module 117 can cause the barcode reading application 105 to enter the motion detection state 201 by calling and passing control to the motion detection module 107. The main module 117 can cause the barcode reading application 105 to enter the decoding state 202 by calling and passing control to the decoding module 106.

In some embodiments, the motion detection module 107 processes captured image frames 104 less frequently than the decoding module 106. More specifically, the motion detection module 107 can be configured to process captured image frames 104 at a certain frequency when the barcode reading application 105 operates in the motion detection state 201. This frequency may correspond to the motion detection processing frequency 110 mentioned above. Similarly, the decoding module 106 can be configured to process captured image frames 104 at a certain frequency when the barcode reading application 105 operates in the decoding state 202. This frequency may correspond to the decoding processing frequency 111 mentioned above. As noted previously, the motion detection processing frequency 110 and the decoding processing frequency 111 can be stored among the parameters 108 in the memory 102 of the computing device 100.

In some embodiments, the motion detection processing frequency 110 can indicate how many image frames 104 are passed to the motion detection module 107 during a particular duration of time (e.g., one second). The motion detection module 107 can perform motion detection by analyzing any two consecutive image frames 104 passed to the motion detection module 107. If there is no change (or very little change) between the consecutive image frames 104, then it may be inferred that no motion has been detected. Conversely, if significant differences are detected between the consecutive image frames 104, then it may be inferred that motion has occurred. The motion that is detected may be motion of the computing device 100. Alternatively, or in addition, the motion that is detected may be motion of an object being brought into or taken out of the field of view of the camera 103.

A few specific examples will be described to show how the motion detection processing frequency 110 can be implemented. In each of these examples, it will be assumed that the image frame rate of the camera 103 (i.e., the rate at which the camera 103 captures image frames 104) is 30 frames per second. Of course, the specific details discussed in these examples are provided for illustrative purposes only and should not be interpreted as limiting the scope of the present disclosure.

Example A: Suppose that the motion detection processing frequency 110 is one. In this case, one image frame 104 per second is passed to the motion detection module 107 and twenty-nine image frames 104 per second are ignored. In one possible implementation, the first image frame 104 captured each second is passed to the motion detection module 107. In this example, the time duration between consecutive image frames 104 passed to the motion detection module 107 is approximately one second. Thus, motion detection is performed by analyzing two image frames 104 that are captured approximately one second apart.

Example B: Suppose that the motion detection processing frequency 110 is two. In this case, two image frames 104 per second are passed to the motion detection module 107 and twenty-eight image frames 104 per second are ignored. In one possible implementation, the $1^{st}$ and $16^{th}$ image frames 104 captured each second are passed to the motion detection module 107. In this example, the time duration between consecutive image frames 104 passed to the motion detection module 107 is approximately ½ second. Thus, motion detection is performed by analyzing two image frames 104 that are captured approximately ½ second apart.

Example C: Suppose that the motion detection processing frequency 110 is three. In this case, three image frames 104 per second are passed to the motion detection module 107 and twenty-seven image frames 104 per second are ignored. For instance, in one possible implementation, the $1^{st}$, $11^{th}$, and $21^{st}$ image frames 104 captured each second are passed to the motion detection module 107.

In this example, the time duration between consecutive image frames 104 passed to the motion detection module 107 is approximately ⅓ A second. Thus, motion detection is performed by analyzing two image frames 104 that are captured approximately ⅓ second apart.

Example D: Suppose that the motion detection processing frequency 110 is five. In this case, five image frames 104 per second are passed to the motion detection module 107 and twenty-five image frames 104 per second are ignored. For instance, in one possible implementation, the $1^{st}$, $7^{th}$, $13^{th}$, $19^{th}$, and $25^{th}$ image frames 104 captured each second are passed to the motion detection module 107. In this example, the time duration between consecutive image frames 104 passed to the motion detection module 107 is approximately ⅕ second. Thus, motion detection is performed by analyzing two image frames 104 that are captured approximately ⅕ second apart.

Example E: Suppose that the motion detection processing frequency 110 is ten. In this case, ten image frames 104 per second are passed to the motion detection module 107 and twenty image frames 104 per second are ignored. For instance, in one possible implementation, the $1^{st}$, $4^{th}$, $7^{th}$, $10^{th}$, $13^{th}$, $16^{th}$, $19^{th}$, $22^{nd}$, $25^{th}$, and $28^{th}$ image frames 104 captured each second are passed to the motion detection module 107. In this example, the time duration between consecutive image frames 104 passed to the motion detection module 107 is approximately 1/10 second. Thus, motion detection is performed by analyzing two image frames 104 that are captured approximately 1/10 second apart.

In Examples A-E discussed above, the same image frames 104 captured in each second can be passed to the motion detection module 107. For instance, in Example A, the same image frame 104 captured in each second (e.g., the $1^{st}$ image frame 104 captured in each second) can be passed to the motion detection module 107. In Example B, the same two image frames 104 captured in each second (e.g., the $1^{st}$ and $16^{th}$ image frames 104 captured in each second) can be passed to the motion detection module 107. In Example C, the same three image frames 104 captured in each second (e.g., the $1^{st}$, $11^{th}$, and $21^{st}$ image frames 104 captured in each second) can be passed to the motion detection module 107. In Example D, the same five image frames 104 captured in each second (e.g., the $1^{st}$, $7^{th}$, $13^{th}$, $19^{th}$, and $25^{th}$ image frames 104 captured in each second) can be passed to the motion detection module 107. In Example E, the same ten image frames 104 captured in each second (e.g., the $1^{st}$, $4^{th}$, $7^{th}$, $10^{th}$, $13^{th}$, $16^{th}$, $19^{th}$, $22^{nd}$, $25^{th}$, and $28^{th}$ image frames 104 captured in each second) can be passed to the motion detection module 107.

However, it is not necessary for the same image frames 104 captured in each second to be passed to the motion detection module 107. In the next example, Example F, different image frames 104 can be passed to the motion detection module 107 from one second to the next.

Example F: Suppose that the motion detection processing frequency 110 is four. In this case, four image frames 104 per second are passed to the motion detection module 107 and twenty-six image frames 104 per second are ignored. Different image frames 104 can be passed to the motion detection module 107 from one second to the next. For instance, in one possible implementation, the $1^{st}$, $8^{th}$, $16^{th}$, and $24^{th}$ image frames 104 captured during the 1st second are passed to the motion detection module 107. Then the $2^{nd}$, $9^{th}$, $17^{th}$, and $25^{th}$ image frames 104 captured during the $2^{nd}$ second are passed to the motion detection module 107. Then the $3^{rd}$, $10^{th}$, 18th, and $26^{th}$ image frames 104 captured during the $3^{rd}$ second are passed to the motion detection module 107, and so on.

The decoding processing frequency 111 can be similar in some respects to the motion detection processing frequency 110, in the sense that the decoding processing frequency 111 can indicate how many image frames 104 are passed to the decoding module 106 during a particular duration of time (e.g., one second).

In some embodiments, the barcode reading application 105 can be configured so that the decoding processing frequency 111 is less than or equal to the image frame rate of the camera 103 (i.e., the rate at which the camera 103 captures image frames 104), and the motion detection processing frequency 110 is less than the decoding processing frequency 111. For example, if the motion detection processing frequency 110 is 1 per second (as in Example A), then the decoding processing frequency 111 could be any value from 2 per second to 30 per second (assuming that the image frame rate is 30 frames per second). Similarly, if the motion detection processing frequency 110 is 2 per second (as in Example B), then the decoding processing frequency 111 could be any value from 3 per second to 30 per second (again, assuming that the image frame rate is 30 frames per second).

In some embodiments, the image frame rate of the camera 103 is fixed. However, the motion detection processing frequency 110 and/or the decoding processing frequency 111 can be configurable parameters.

In some embodiments, the decoding module 106 and the motion detection module 107 can be included in a software development kit (SDK). A software developer can use the SDK to create the barcode reading application 105. The SDK can allow the software developer to specify the values of the motion detection processing frequency 110 and/or the decoding processing frequency 111. This allows the software developer to tailor the performance of the barcode reading application 105 based on the specific needs of its intended users. For example, if preserving the battery of the computing device 100 is a high priority, then the motion detection processing frequency 110 and/or the decoding processing frequency 111 can be set to relatively low values so that motion detection and/or decoding are performed less frequently. On the other hand, if performance and responsiveness are high priorities and battery preservation is less important, then the motion detection processing frequency 110 and/or the decoding processing frequency 111 can be set to relatively high values so that motion detection and/or decoding are performed more frequently.

In some embodiments, the barcode reading application 105 can be configured so that a user of the barcode reading application 105 can change the motion detection processing frequency 110 and/or the decoding processing frequency 111 via the user interface 112 of the barcode reading application 105. This allows the user of the barcode reading application 105 to tailor the performance of the barcode reading application 105 based on the user's specific needs.

The camera 103 can be capable of capturing image frames 104 having varying resolutions. In some embodiments, the image frames 104 processed by the motion detection module 107 have a lower resolution than the image frames 104 processed by the decoding module 106. In other words, while in the motion detection state 201 the motion detection module 107 can process lower resolution image frames 104 for purposes of motion detection. Then, once motion within the field of view of the camera 103 has been detected, the barcode reading application 105 can transition to the decoding state 202 and the decoding module 106 can process higher resolution image frames 104 for purposes of barcode decoding. Because it does not require as much computation by the processor 101 to process lower resolution image frames 104 as it does to process higher resolution image frames 104, the use of lower resolution image frames 104 for purposes of motion detection can provide additional savings with respect to the usage of the processor 101 in the computing device 100.

Figure 3:
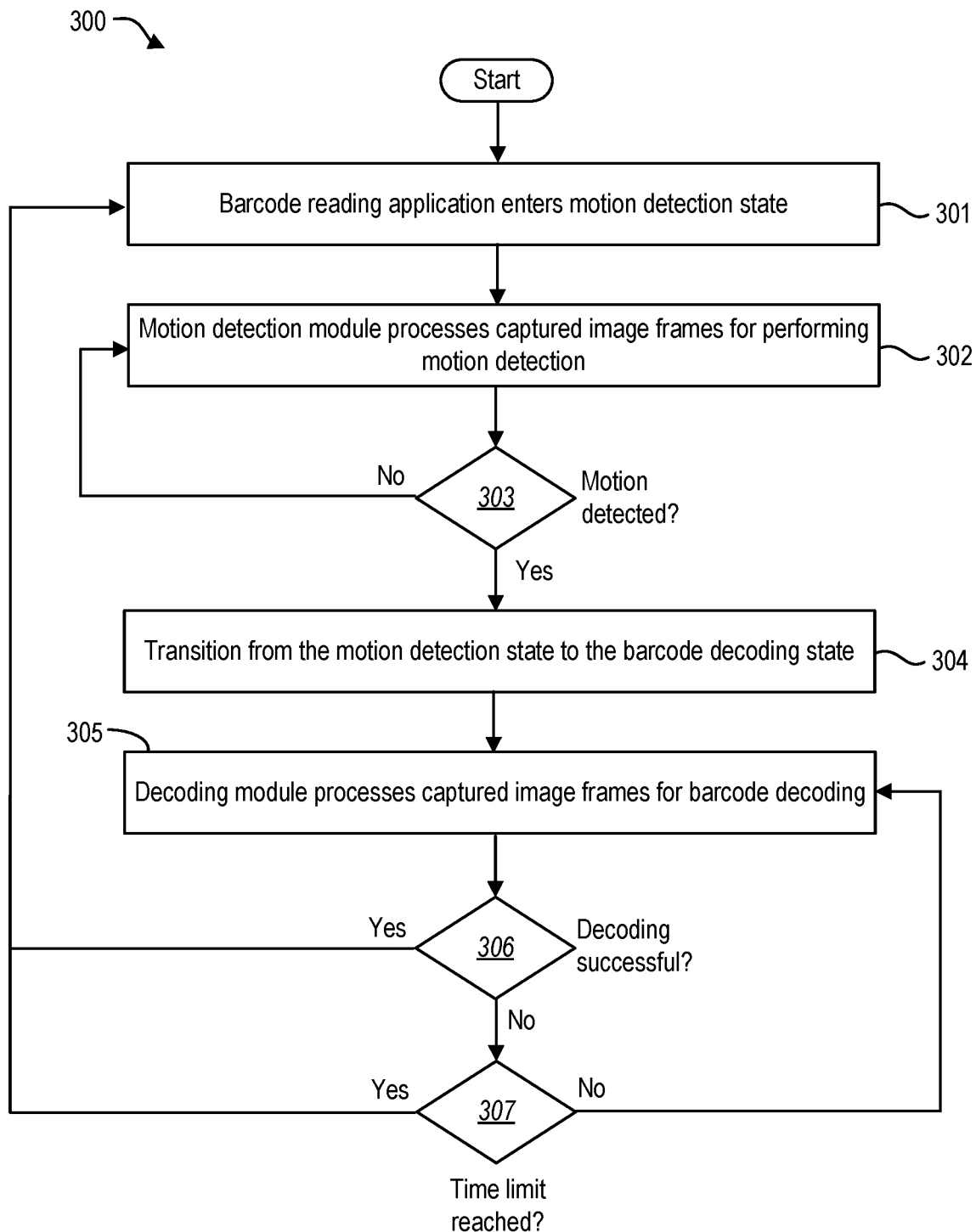
FIG. 3 illustrates an example of a method that can be performed by the barcode reading application in accordance with at least some embodiments of the present invention.

FIG. 3 illustrates an example of a method 300 that can be performed by the barcode reading application 105 in accordance with the present disclosure.

At 301, the barcode reading application 105 enters the motion detection state 201. At 302, while the barcode reading application 105 is in the motion detection state 201, the motion detection module 107 processes captured image frames 104 for performing motion detection.

At 303, performing motion detection can include periodically determining whether motion has been detected in the field of view of the camera 103. If the result of this determination is that motion has not been detected in the field of view of the camera 103, then the method 300 can return to 302 and the motion detection module 107 can continue processing captured image frames 104 for performing motion detection.

If the result of the determination at 303 is that motion has been detected in the field of view of the camera 103, then at 304 the barcode reading application 105 transitions from the motion detection state 201 to the decoding state 202. At 305, while the barcode reading application 105 is in the decoding state 202, the decoding module 106 processes captured image frames 104 for barcode decoding.

At 306, processing captured image frames 104 for barcode decoding includes, among other things, determining whether a barcode is successfully decoded. If a barcode is successfully decoded, then the method 300 can return to 301, where the barcode reading application 105 enters the motion detection state 201. The method 300 then continues as described above.

If the result of the determination at 306 is that a barcode has not been successfully decoded, then at 307 a determination can be made about whether the decoding module 106 has processed captured image frames 104 for the decoding time limit 109. If the result of the determination at 307 is that the decoding module 106 has processed captured image frames 104 for the decoding time limit 109, then the processing in 305 can stop and the method 300 can return to 301, where the barcode reading application 105 returns to the motion detection state 201. The method 300 then proceeds as described above. On the other hand, if the result of the determination at 307 is that the decoding module 106 has not processed captured image frames 104 for the decoding time limit 109, then the method 300 returns to 305 and the decoding module 106 continues to process captured image frames for barcode decoding. The method 300 then continues as described above, and the processing in 305 continues until the decoding time limit 109 is reached.

Figure 4:
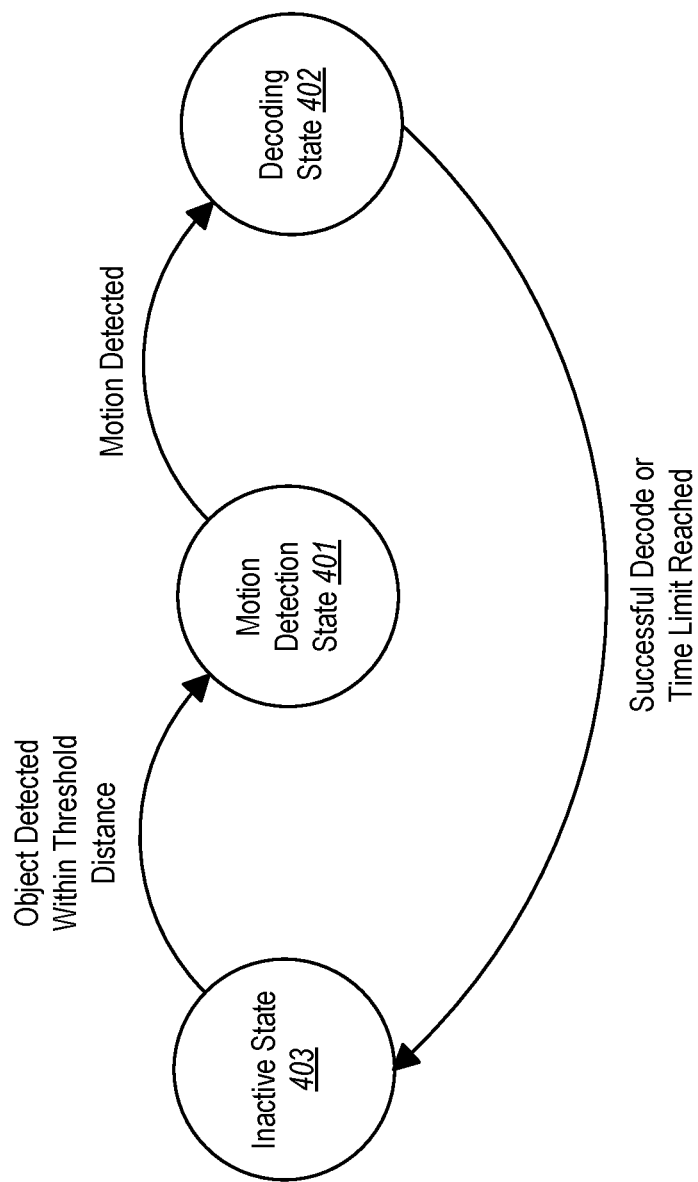
FIG. 4 is a state diagram that illustrates three possible states (an inactive state, a motion detection state, and a decoding state) in which the barcode reading application can be configured to operate in accordance with at least some embodiments of the present invention in which the computing device includes a proximity sensor.

FIG. 4 illustrates another example of a state diagram that represents certain states in which the barcode reading application 105 can be configured to operate. As noted above, in some embodiments the computing device 100 can include a proximity sensor 113 that is capable of detecting when another object is within a threshold distance of the computing device 100. The proximity sensor 113 can be capable of detecting any object, including but not limited to objects having barcodes thereon. For purposes of the example state diagram depicted in FIG. 4, it will be assumed that the computing device 100 includes a proximity sensor 113.

In the depicted example, in addition to being capable of operating in a motion detection state 401 and in a decoding state 402, the barcode reading application 105 is also capable of operating in an inactive state 403. The motion detection state 401 and the decoding state 402 are similar to the motion detection state 201 and the decoding state 202 described previously. In the motion detection state 401, the motion detection module 107 processes captured image frames 104 and the decoding module 106 does not process captured image frames 104. Conversely, in the decoding state 402, the decoding module 106 processes captured image frames 104 and the motion detection module 107 does not process captured image frames 104. In the inactive state 403, neither the motion detection module 107 nor the decoding module 106 processes captured image frames 104.

The barcode reading application 105 transitions from the inactive state 403 to the motion detection state 401 when the proximity sensor 113 detects an object within a threshold distance of the computing device 100. The barcode reading application 105 transitions from the motion detection state 401 to the decoding state 402 when the motion detection module 107 detects motion in the field of view of the camera 103. The barcode reading application 105 transitions from the decoding state 402 back to the inactive state 403 when the decoding module 106 successfully decodes a barcode or the decoding module 106 processes captured image frames 104 for the decoding time limit 109 without successfully decoding a barcode.

FIG. 5 illustrates another example of a method 500 that can be performed by the barcode reading application 105 in accordance with the present disclosure. For purposes of the method 500 illustrated in FIG. 5, it will be assumed that the computing device 100 includes a proximity sensor 113 and that the barcode reading application 105 is capable of operating in an inactive state 403, a motion detection state 401, and a decoding state 402 as shown in FIG. 4.

At 501, the barcode reading application 105 enters the inactive state 403. At 502, while in the inactive state 403, the barcode reading application 105 periodically determines whether the proximity sensor 113 has detected an object within a threshold distance of the computing device 100. As long as no object is detected, then at 503 the barcode reading application 105 remains in the inactive state 403.

When the proximity sensor 113 detects an object within a threshold distance of the computing device 100, then at 504 the barcode reading application 105 transitions from the inactive state 403 to the motion detection state 401. At 505, while the barcode reading application 105 is in the motion detection state 401, the motion detection module 107 processes captured image frames 104 for performing motion detection.

At 506, performing motion detection includes periodically determining whether motion has been detected in the field of view of the camera 103. If the result of the determination at 506 is that motion has not been detected in the field of view of the camera 103, then the method 500 returns to 505 and the motion detection module 107 continues processing captured image frames 104 for performing motion detection.

If the result of the determination at 506 is that motion has been detected in the field of view of the camera 103, then at 507 the barcode reading application 105 transitions from the motion detection state 401 to the decoding state 402. At 508, while the barcode reading application 105 is in the decoding state 402, the decoding module 106 processes captured image frames 104 for barcode decoding.

At 509, a determination is made about whether a barcode has been successfully decoded. If the result of the determination at 509 is that a barcode has been successfully decoded, then the method 500 returns to 501, where the barcode reading application 105 transitions from the decoding state 402 to the inactive state 403. The method 500 then continues as described above.

If the result of the determination at 509 is that a barcode has not been successfully decoded, then at 510 a determination is made about whether the decoding module 106 has processed captured image frames 104 for the decoding time limit 109. If the result of the determination at 510 is that the decoding module 106 has processed captured image frames 104 for the decoding time limit 109, then the method 500 returns to 501, where the barcode reading application 105 transitions from the decoding state 402 to the inactive state 403. The method 500 then continues as described above.

If the result of the determination at 510 is that the decoding module 106 has not processed captured image frames 104 for the decoding time limit 109, then the method 500 returns to 508, where the decoding module 106 continues to process captured image frames 104 for barcode decoding. The method 500 then continues as described above.

The techniques disclosed herein can be implemented in hardware, software, firmware, or any combination thereof, unless specifically described as being implemented in a specific manner.

At least some of the features disclosed herein have been described as instructions that are executable by a processor to perform various operations, actions, or other functionality. The term "instructions" should be interpreted broadly to include any type of computer-readable statement(s). For example, the term "instructions" may refer to one or more programs, routines, sub-routines, functions, procedures, modules etc. "Instructions" may comprise a single computer-readable statement or many computer-readable statements. In addition, instructions that have been described separately in the above description can be combined as desired in various embodiments.

The term "processor" should be interpreted broadly to encompass a general-purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term "memory" may refer to various types of processor-readable media such as random-access memory (RAM), read-only memory (ROM), non-volatile random-access memory (NVRAM), programmable read-only memory (PROM), erasable programmable read-only memory (EPROM), electrically erasable PROM (EEPROM), flash memory, magnetic or optical data storage, registers, etc. Memory is said to be communicatively coupled to a processor if the processor can read information from and/or write information to the memory. Memory that is integral to a processor is communicatively coupled to the processor.

The term "communicatively coupled" refers to coupling of components such that these components are able to communicate with one another through, for example, wired, wireless, or other communications media. The term "communicatively coupled" can include direct, communicative coupling as well as indirect or "mediated" communicative coupling. For example, a component A may be communicatively coupled to a component B directly by at least one communication pathway, or a component A may be communicatively coupled to a component B indirectly by at least a first communication pathway that directly couples component A to a component C and at least a second communication pathway that directly couples component C to component B. In this case, component C is said to mediate the communicative coupling between component A and component B.

Any communication interface(s) described herein can be based on wireless communication technology and/or wired communication technology. Some examples of communication interfaces that are based on wireless communication technology include a Bluetooth wireless communication adapter, a wireless adapter that operates in accordance with an Institute of Electrical and Electronics Engineers (IEEE) 802.11 wireless communication protocol, and an infrared (IR) communication port. Some examples of communication interfaces that are based on wired communication technology include a Universal Serial Bus (USB) and an Ethernet adapter.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements.

The phrase "based on" does not mean "based only on," unless expressly specified otherwise. In other words, the phrase "based on" describes both "based only on" and "based at least on."

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

References to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A general-purpose computing device that is configured for barcode reading, comprising:
    a camera that is configured to capture image frames, the camera having a field of view;
    a proximity sensor;
    a processor;
    memory that is communicatively coupled to the processor; and
    a barcode reading application stored in the memory, the barcode reading application being operable in a motion detection state, a decoding state, and an inactive state, the barcode reading application comprising:
        a motion detection module that is executable by the processor to process captured image frames for performing motion detection, wherein the motion detection module does not process captured image frames unless the proximity sensor has detected an object within a threshold distance of the general-purpose computing device, and wherein the motion detection module processes captured image frames at a motion detection processing frequency when the barcode reading application operates in the motion detection state; and
        a decoding module that is executable by the processor to implement one or more barcode decoding algorithms, wherein the decoding module does not process captured image frames unless the motion detection module has detected motion in the field of view of the camera, wherein the decoding module processes captured image frames at a decoding processing frequency when the barcode reading application operates in the decoding state, and wherein the motion detection processing frequency is less than the decoding processing frequency;
    wherein neither the motion detection module nor the decoding module processes captured image frames when the barcode reading application is in the inactive state;
    wherein the motion detection module processes captured image frames and the decoding module does not process captured image frames when the barcode reading application is in the motion detection state; and
    wherein the decoding module processes captured image frames and the motion detection module does not process captured image frames when the barcode reading application is in the decoding state.

2. The general-purpose computing device of claim 1, wherein:
    in the motion detection state, the motion detection module processes captured image frames and the decoding module does not process captured image frames; and
    in the decoding state, the motion detection module does not process captured image frames and the decoding module processes captured image frames.

3. The general-purpose computing device of claim 2, wherein:
    the barcode reading application transitions from the motion detection state to the decoding state when the motion detection module detects motion in the field of view of the camera; and
    the barcode reading application transitions from the decoding state to the motion detection state when the decoding module successfully decodes a barcode or processes captured image frames for a decoding time limit.

4. The general-purpose computing device of claim 1, wherein the motion detection processing frequency and the decoding processing frequency are configurable parameters that can be changed via a user interface of the barcode reading application.

5. The general-purpose computing device of claim 1, wherein the image frames processed by the motion detection module have a lower resolution than the image frames processed by the decoding module.

6. The general-purpose computing device of claim 1, wherein:
    the barcode reading application transitions from the inactive state to the motion detection state when the proximity sensor detects an object within the threshold distance of the general-purpose computing device;
    the barcode reading application transitions from the motion detection state to the decoding state when the motion detection module detects motion in the field of view of the camera; and
    the barcode reading application transitions from the decoding state to the inactive state when the decoding module successfully decodes a barcode or processes captured image frames for a decoding time limit.

7. The general-purpose computing device of claim 1, wherein the barcode reading application is developed using a software development kit (SDK) that comprises the motion detection module and the decoding module.

8. The general-purpose computing device of claim 1, wherein performing motion detection comprises analyzing two consecutive image frames that are passed to the motion detection module.

* * * * *